(12) United States Patent
Valasek et al.

(10) Patent No.: US 8,500,083 B2
(45) Date of Patent: Aug. 6, 2013

(54) DEVICE FOR A MOVING OBJECT'S VIBRATION DAMPING

(75) Inventors: Michael Valasek, Prague (CZ); Michal Mikulec, Prague (CZ)

(73) Assignee: Cvut V Praze, Fakulta Stronjni, Prague (CZ)

( * ) Notice: Subject to any disclaimer, the term of this patent is extended or adjusted under 35 U.S.C. 154(b) by 417 days.

(21) Appl. No.: 12/743,001

(22) PCT Filed: Nov. 5, 2008

(86) PCT No.: PCT/CZ2008/000137
§ 371 (c)(1),
(2), (4) Date: May 14, 2010

(87) PCT Pub. No.: WO2009/062455
PCT Pub. Date: May 22, 2009

(65) Prior Publication Data
US 2010/0268387 A1    Oct. 21, 2010

(30) Foreign Application Priority Data

Nov. 14, 2007    (CZ) .................................... 2007-792

(51) Int. Cl.
*F16M 13/00*    (2006.01)
(52) U.S. Cl.
USPC ........................ 248/562; 252/62.52
(58) Field of Classification Search
USPC .................. 248/562, 636, 638; 252/62.52
See application file for complete search history.

(56) References Cited

U.S. PATENT DOCUMENTS

| 989,958 A | 4/1911 | Frahm |
| 5,431,261 A | 7/1995 | Olgac |

(Continued)

FOREIGN PATENT DOCUMENTS

| CA | 2 245 404 | 2/2000 |
| DE | 41 34 354 | 4/1993 |

(Continued)

OTHER PUBLICATIONS

Furuishi, et al., "Active Control of Structural Vibration by Active Mass Damper" (English summary), The Japan Society of Mechanical Engineers, vol. 52, 1986, pp. 683-687.

*Primary Examiner* — Gwendolyn Baxter
(74) *Attorney, Agent, or Firm* — Preti Flaherty Beliveau & Pachios LLP

(57) ABSTRACT

This invention concerns a device for vibration damping of an object (1) moving along a trajectory arranged on a frame (7), whereas the object (1) involves spaces filled-in with magnetorheologic fluid which moves towards the object (1) and the device contents at least one control electromagnet (2,12) for achieving magnetorheologic fluid condition change to which a signal for vibration damping is fed from a control unit, whereas the control electromagnet/s (2,12) is/are arranged firmly on the frame on which the object's (1) trajectory is positioned. The control electromagnets (2,12) are arranged evenly with regard to the object's (1,5) trajectory (4,14), in case of need evenly to one another. In case of an object (1) pivoted on a frame (7) and fitted with at least one centrifugal pendulum (6) connected to the object (1) through a damper (11) with magnetorheologic fluid which moves towards the object (1) and the device involves at least one control electromagnet (12) for achieving magnetorheologic fluid condition change, to which a signal is fed from a control unit, at least one control electromagnet (12) regulated by controllable power supply for electromagnetic field intensity control is arranged along the circular trajectory (14) of the dampers (11) on the frame (7).

11 Claims, 4 Drawing Sheets

U.S. PATENT DOCUMENTS

Figure 1:
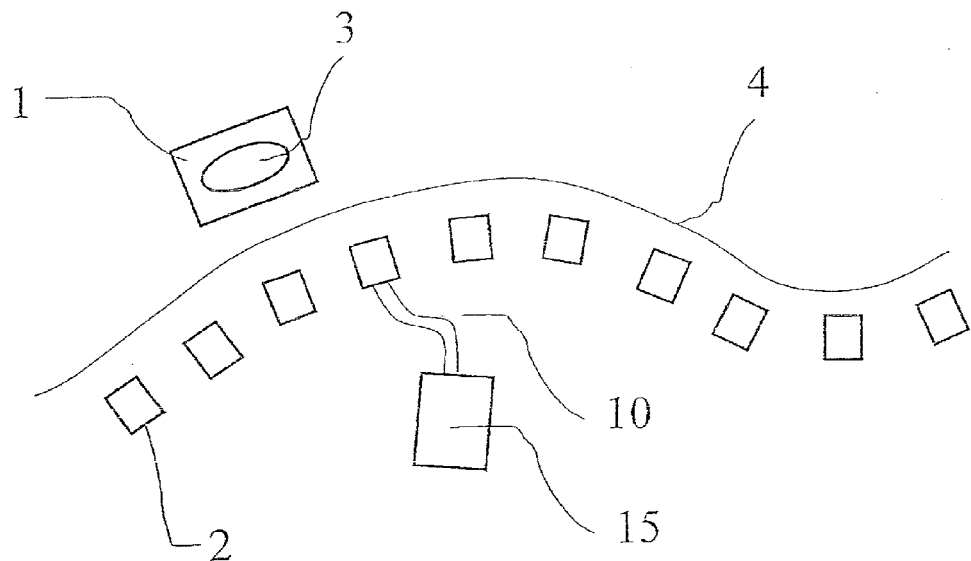

| | | | |
|---|---|---|---|
| 5,829,319 A | 11/1998 | Mokeddem | |
| 5,934,424 A | 8/1999 | Hosek et al. | |
| 6,681,905 B2* | 1/2004 | Edmondson et al. | 188/267.2 |
| 6,692,650 B2* | 2/2004 | Park et al. | 252/62.52 |
| 2007/0013215 A1* | 1/2007 | Browne et al. | 297/250.1 |
| 2007/0125193 A1* | 6/2007 | Augustine et al. | 74/339 |
| 2007/0137955 A1 | 6/2007 | Maranville et al. | |
| 2008/0294314 A1* | 11/2008 | Morris et al. | 701/49 |
| 2009/0026033 A1* | 1/2009 | Steinwender et al. | 192/21.5 |

FOREIGN PATENT DOCUMENTS

| | | |
|---|---|---|
| DE | 103 29 982 | 2/2005 |
| EP | 1 258 650 | 11/2002 |
| GB | 337466 | 11/1930 |
| JP | 3-292435 | 12/1991 |
| WO | WO 2005/111460 | 11/2005 |

\* cited by examiner

DEVICE FOR A MOVING OBJECT'S VIBRATION DAMPING

TECHNICAL FIELD

This invention concerns a device for vibration damping of an object moving along a trajectory arranged on a frame, whereas the object involves spaces filled-in with magnetorheologic fluid which moves towards the object and the device contents at least one control electromagnet for achieving magnetorheologic fluid condition change, to which a signal for vibration damping is fed from a control unit.

STATE-OF-THE-ART

Vibrations are usually an undesirable phenomenon during various equipments and most machines running. It concerns particularly rotating machine parts vibration. To reduce vibration, there are excitation source diminishing or machine moving parts balance used, or vibration damping is applied. For vibration damping, there are additional dynamic parts or friction media applied.

Friction dampers are described in UK patent 21139 from the year 1910 and in an article by J. P. Den Hartog and J. P. Ormondroyd "Torsional Vibration Dampers" in Transactions of ASME, vol. 52(1930), p. 13. Passive torsion vibration absorbers are described in U.S. Pat. No. 989,958 from the year 1911, passive centrifugal pendulum absorbers are described in UK patent 337466 from the year 1929. Active (controlled) vibration absorbers are described in an article by Y. Furuishi and J. Taketou "Vibration Control of Structure by Active Mass Damper" in Transactions of JSME vol. 52(1986), p. 683, in U.S. Pat. No. 5,431,261 from the year 1995 and active (controlled) torsion centrifugal pendulum absorbers are described in U.S. Pat. No. 5,934,424 from the year 1999.

Relatively wide-spread vibration damping consists in application of electro or magnetorheologic fluid which fills-in a certain space in equipment or machine, whereas in this fluid there is a moving, eventually rotating, component connected with vibration source.

A controlled change of rheologic fluids' properties with the aim of subsequent vibration reduction is aimed by a modification of electric or magnetic field inside of which the rheologic fluid is situated. When magnetorheologic fluid is applied, to change its properties there is power supply of electromagnets situated in a rotating or moving part used. The electromagnetic field change induced by these electromagnets is controlled in relation to electromagnets power supply modification, where feed, eventually control source of electromagnets is arranged in a solid part of a device, event. outside of moving parts containing magnetorheologic fluid. Therefore there are connectors, to which a signal for electromagnets is fed, created on moving parts of a device. However, a mechanic contact of moving connectors with static feeding line for electromagnets' magnetic field change brings disadvantages consisting in contact surfaces wear, resulting in inaccurate electromagnet control; these connections operating life reduction happens as well; this solution with contacts cannot be used in some means for work at all.

Examples of such an application of magnetorheologic fluid in a torsion vibration damper is CA patent 2245404 from the year 2000, DE patent 4134354 from the year 1993, U.S. Pat. No. 5,829,319 from the year 1998, JP patent 3292435 from the year 1991.

The aim of this invention is a device for a moving object's vibration damping at which there would be achieved easier, constructionally less demanding electromagnet control for magnetorheologic fluid properties modification, whereas a higher reliability of this device in comparison with existing ones would be achieved.

SUBJECT MATTER OF THE INVENTION

Subject matter of contactless control of magnetorheologic damper for moving object's vibration damping consists in a firm arrangement of control electromagnet/s in a frame on which an object's trajectory is positioned. Control electromagnets are arranged evenly regarding the object's trajectory or evenly to one another.

The object involves at least one dimensionally stable space, a larger part of which being filled-in with magnetorheologic fluid reaching into a tapered neck of the space. Alternatively, the object is fitted with at least one layer of a composite material, partly filled-in with magnetorheologic fluid. A composite material layer is porous and/or spongy.

In case of an object pivoted on a frame and fitted with at least one centrifugal pendulum connected with the object via dampers with magnetorheologic fluid, there is, along the dampers circular track, at least one control electromagnet arranged on the frame, regulated by a controllable power source for intensity control of its electromagnetic field.

Alternatively, the object, partly filled-in with magnetorheologic fluid, is elastic and it is conjugated with a vibration source body, whereas control electromagnets are arranged around the object, eventually the object is arranged inside the winding of the control electromagnet/s.

The invention's advantage is that it is not necessary to feed the moving object with signals for regulation of control electromagnets. By this, the design is simplified and, in many cases of aggressive environment in which the object moves, enabled at all. Further, it is even possible to reduce the moving object weight because the control electromagnets do not move along with the object.

SURVEY OF FIGURES ON DRAWINGS

Figure 2:
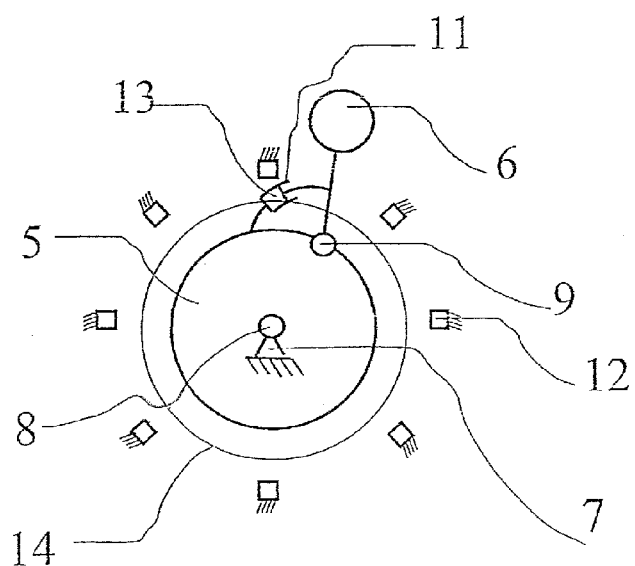

The device for the magnetorheologic damper control according to the invention is schematically pictured in attached figures, where FIG. 1 Represents a general arrangement for magnetorheologic fluid condition control in a generally moving object, FIG. 2 Represents the arrangement for torsion vibration damping of shafts or rotating disks with the help of magnetorheologic damper control effecting on centrifugal pendulums of the torsion oscillation dynamic absorber.

Figure 3:
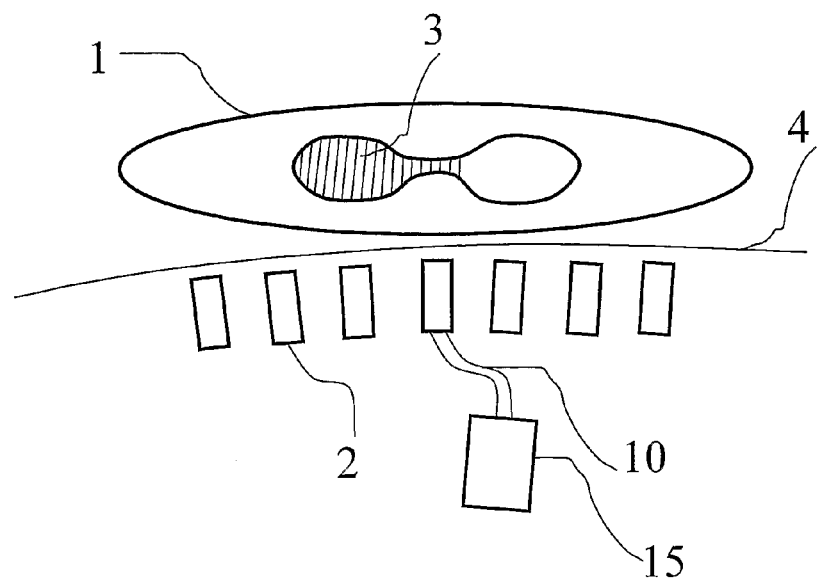
Figure 4:
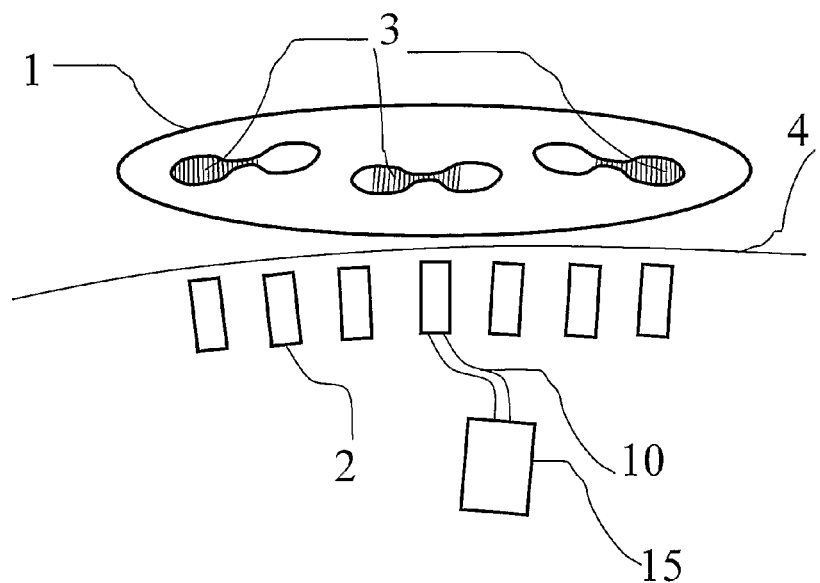
Figure 5:
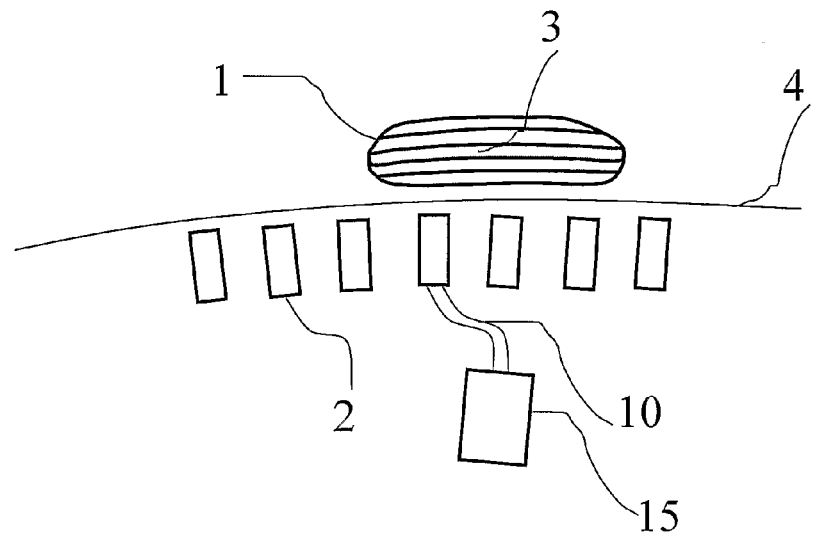
Figure 6:
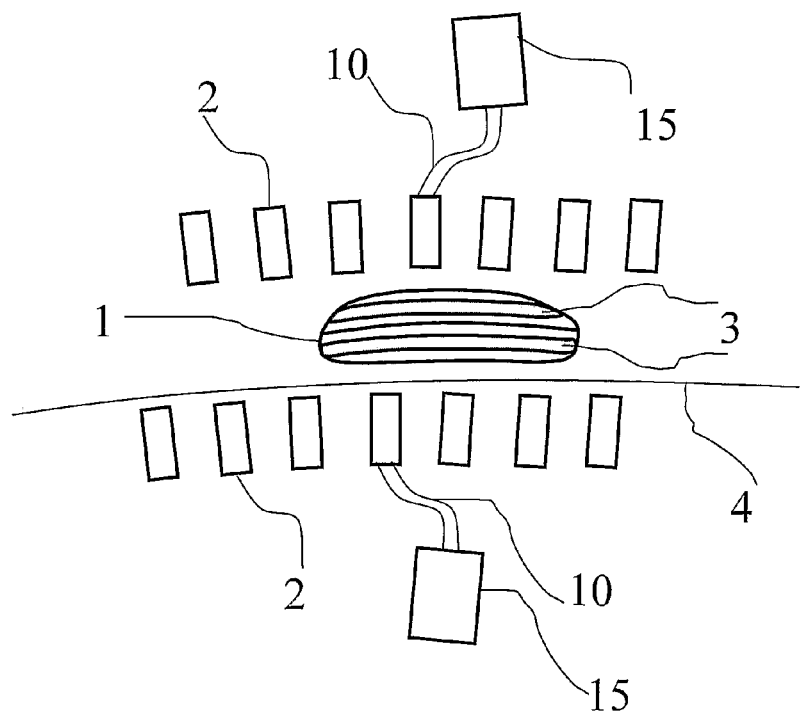
Figure 7:
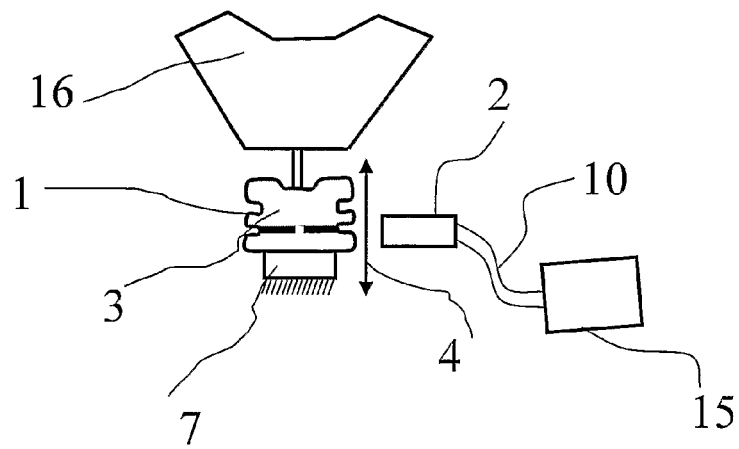
Figure 8:
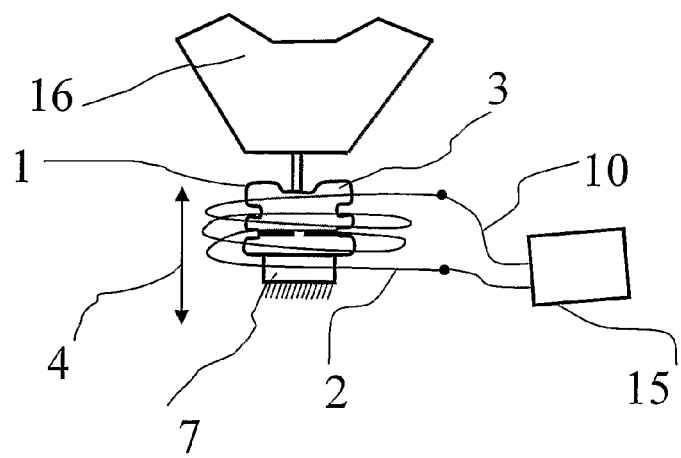

FIG. 3 Represents the arrangement for control of the condition of the magnetorheologic fluid arranged in one space inside the body which does not need to be a traditional damper, FIG. 4 Represents the arrangement for control of the condition of the magnetorheologic fluid arranged in more spaces inside the body which do not need to be traditional dampers, FIG. 5 Represents the arrangement for control of the condition of the magnetorheologic fluid inside a composite body where the magnetorheologic fluid is involved in a space created by a material layer with manifold connected or separated passes, e.g. sponge, FIG. 6 Represents the arrangement for control of the condition of the magnetorheologic fluid inside a composite body where the magnetorheologic fluid is involved in a space created by a material layer with manifold connected or separated passes, e.g. sponge, whereas there are several of these layers in the body, FIG. 7 Represents the arrangement for control of the condition of the magnetorheologic fluid inside a body which is connected with a vibration source, e.g. through a flexibly mounted engine block which makes reversing (oscillatory) motion and with electromagnet/s arranged on a frame, FIG. 8 Represents the arrangement for control of the condition of the magnetorheologic fluid, similarly as in FIG. 7, with the electromagnet alternative arrangement.

EXAMPLES OF THE DEVICE DESIGN

As it is evident in FIG. 1, object 1 is moving evenly or unevenly along trajectory 4 arranged on a frame, eventually on a basis. As a matter of fact, that could be a random non-rectilinear trajectory, in some case a rectilinear trajectory. Inside object 1, there is a dimensionally stable cavity created which is filled-in with dampening magnetorheologic fluid 3. Along trajectory 4, there are control electromagnets 2 arranged evenly to which a signal for control electromagnets 2 magnetic field's intensity modification is fed from control unit 15 through power supply cable 10. Control unit 15 is represented by e.g. a controllable power source. This magnetic field modification will make a required magnetorheologic fluid 3 condition change resulting in reduction of vibration caused by object 1 during moving along trajectory 4.

Scanning vibration from object 1 is not showed in FIG. 1. Signals from sensors for picking-up vibration of object 1 or trajectory 4, which object 1 moves along, are led into control unit 15 where they are assessed so that a signal for control magnets' 2 magnetic field change can be emitted. Sensors for vibration scanning may be positioned on object 1 or on frame 7, signals into control unit 15 can be transmitted contactlessly, for instance by emission, in case of need by a cable.

The number of control electromagnets 2 is optional from one to more, depending on the trajectory and requirement for the whole system damping intensity. Accordingly, it is not imperative to arrange the control electromagnets evenly with regard to trajectory 4 and to one another. The controlled magnetic field modifies, above all, the magnetorheologic fluid 3 viscosity.

In FIG. 2, the body causing the undesirable vibration is a rotating object 5 positioned on frame 7 and rotating around a rotation axis 8. The demonstrated rotating object 5 is represented in a shape of a disk. In order to reduce vibration, object 5 is, on its perimeter, fitted with at least one pendulum 6 representing the torsion dynamic absorber which is positioned on the disk and moving along trajectory 14, whereas connected with one part of damper 11 the second part of which is connected with object 5. The cavity formed between both parts of damper 11 is filled-in with dampening magneto-rheological fluid 13 Likewise in the example of design according to Fig.1, the vibration scanned by sensors (not illustrated) are transferred from rotating object 5 for assessment into control unit (not illustrated) from which the required signals for control electromagnets' 12 magnetic field intensity change are sent. By control electromagnets' 12 magnetic field intensity change, characteristics, eventually a condition of magneto-rheological fluid 13 are changed resulting in follow-up reduction of vibration caused by irregular rotation of object 5, eventually by uneven distribution of its mass.

In FIG. 3, object 1 is moving along trajectory 4. Inside body 1, there is a dimensionally stable space partly filled-in with magneto-rheological fluid 3 which, during the motion of object 1, flows over from one part of this space to the other while flowing through tapered neck. Magneto-rheological fluid 3 flow inside the space and, at the same time, changes of its position towards object 1 are controlled with the help of number of electromagnets 2 arranged along trajectory 4. Electromagnets 2 are controlled by control unit 15 through power supply line 10 according to signals scanned on the moving body 1 or in its surroundings. Regulation is performed by control electromagnets' 2 magnetic field required intensity change which modifies characteristics, eventually a condition of magneto-rheological fluid 3, by this its deceleration or acceleration happens as well as its translocation with regard to object 1, thus resulting in a follow-up reduction of vibration caused by irregular motion of object 1, eventually by uneven distribution of its mass.

In FIG. 4, there is object 1 demonstrated, analogous to FIG. 3, but in this case, in object 1 there are more spaces partly filled-in with magnetorheologic fluid 3 the motion of which, towards object 1, is influenced by a number of electromagnets 2 arranged along trajectory 4. However, in this case a number of electromagnets 2 arranged along trajectory 4 operates, by magnetic field intensity change, magnetorheologic fluid 3 in more spaces in body 1 at the same time.

In FIG. 5, there is object 1 showed, formed by traditional and/or composite materials and moving along trajectory 4. Inside object 1, some of composite material layers is partly filled-in by magneto-rheological fluid 3, for instance a layer of porous (spongy) material. Other parts or layers of object 1 may be movable or pliable towards this layer filled-in with magneto-rheological fluid 3 so that they deform, eventually compress this layer with magneto-rheological fluid. However, this layer with magneto-rheological fluid 3 may also be stable in volume and shape and magneto-rheological fluid 3 flows, while moving, through individual passes of this layer. Magneto-rheological fluid 3 flow inside this porous (spongy) material towards object 1 is controlled with the help of number of electromagnets 2 arranged along trajectory 4. Electromagnets 2 are controlled by control unit 15 through power supply line 10 according to signals scanned on the moving body 1 or in its surroundings. Regulation is performed by control electromagnets' 2 magnetic field required intensity change which modifies characteristics, eventually a condition of magneto-rheological fluid 3, by this deceleration or acceleration of its motion inside object 1 happens, thus resulting in a follow-up reduction of vibration caused by irregular motion of object 1, eventually by uneven distribution of its mass.

Other possibility is that object 1 is fitted with at least one flexible layer filled-in with magnetorheologic fluid 3 completely. This layer's shape change is simplified or aggravated in dependence on change of magnetorheologic fluid 3 properties.

In FIG. 6, there is object 1 demonstrated, analogous to FIG. 5, but in this case, in object 1 there are more layers, eventually spaces of composite material partly filled-in with magneto-rheological fluid 3. Magneto-rheological fluid 3 motion towards object 1 is controlled with the help of number of electromagnets 2 arranged along trajectory 4. However, in this case, a number of electromagnets 2 arranged along trajectory 4 controls, by magnetic field intensity change, properties of magneto-rheological fluid 3 in more layers of body 1 at the same time. In this figure, there is evident arrangement of control magnets 2 on two (more) sides of the moving object 1.

In FIG. 7, there is object 1 demonstrated making an oscillatory motion along trajectory 4 and serving for body 16 vibration damping, for example engine block embedded on frame 7 with the help of object 1 which is in a form of elastically dampening element here. Object 1 is partly filled-in with magneto-rheological fluid 3 which moves inside. Its motion is controlled by a change of its condition with the help of intensity of magnetic field created by a number of electromagnets 2 arranged along trajectory 4. Electromagnets 2 are controlled by control unit 15 through power supply line 10 according to signals scanned on the moving object 1 or on body 16 or by their effects on frame 7. Regulation is performed by control electromagnets' 2 magnetic field required intensity change which modifies characteristics, eventually a condition of magneto-rheological fluid 3, by this deceleration or acceleration of its motion inside the body while flowing through tapered points inside object 1 happens, thus resulting in a follow-up reduction of vibration caused by body 16 motion transferred to object 1 motion.

In FIG. 8, there is object 1 demonstrated, analogous to FIG. 7, but in this case object 1 is arranged inside the winding of control electromagnets 2.

The invention claimed is:

1. A device for vibration damping of an object moving along a trajectory arranged on a frame, comprising:
    a frame having a trajectory thereon;
    an object disposed to move along the trajectory of the frame, the object further comprising a space therein, a magneto-rheological fluid movably disposed within the space;
    at least one control electromagnet operative to alter of the magneto-rheological fluid within the object, the at least one control electromagnet fixedly disposed on the frame; and
    a control unit in communication with the at least one electromagnet operative to provide a signal to the electromagnet for vibration damping by altering the magneto-rheological fluid within the object.

2. The device of claim 1, wherein the at least one control electromagnet comprises a plurality of control electromagnets arranged evenly regarding the trajectory of the frame.

3. The device of claim 2, wherein the space comprises at least one dimensionally stable space, a larger part of the dimensionally stable space being filled-in with the magneto rheological fluid reaching into a tapered neck of the dimensionally stable space.

4. The device of claim 2, wherein the object includes at least one pliable layer, the magneto-rheological fluid filling the at least one pliable layer.

5. The device of claim 1, wherein the at least one control electromagnet comprises a plurality of control electromagnets arranged evenly to one another.

6. The device of claim 5, wherein the space comprises at least one dimensionally stable space, a larger part of the dimensionally stable space being filled-in with magneto-rheological fluid reaching into a tapered neck of the dimensionally stable space.

7. The device of claim 5, wherein the object includes at least one pliable layer, the magneto-rheological fluid filling the at least one pliable layer.

8. The device of claim 1, wherein the space comprises at least one dimensionally stable space, a larger part of the dimensionally stable space being filled-in with magneto-rheological fluid reaching into a tapered neck of the dimensionally stable space.

9. The device of claim 1, wherein the object includes at least one pliable layer, the magneto-rheological fluid filling the at least one pliable layer.

10. The device of claim 1, wherein the object includes a layered composite material, the magneto-rheological fluid filling at least a part within the layered composite material.

11. The device of claim 10, wherein the layered composite material is porous or spongy or porous and spongy.

* * * * *